No. 651,606. Patented June 12, 1900.
L. W. JOHNSON & H. J. FALK.
SYSTEM OF OIL DISTRIBUTION.
(Application filed Feb. 7, 1900.)
(No Model.)
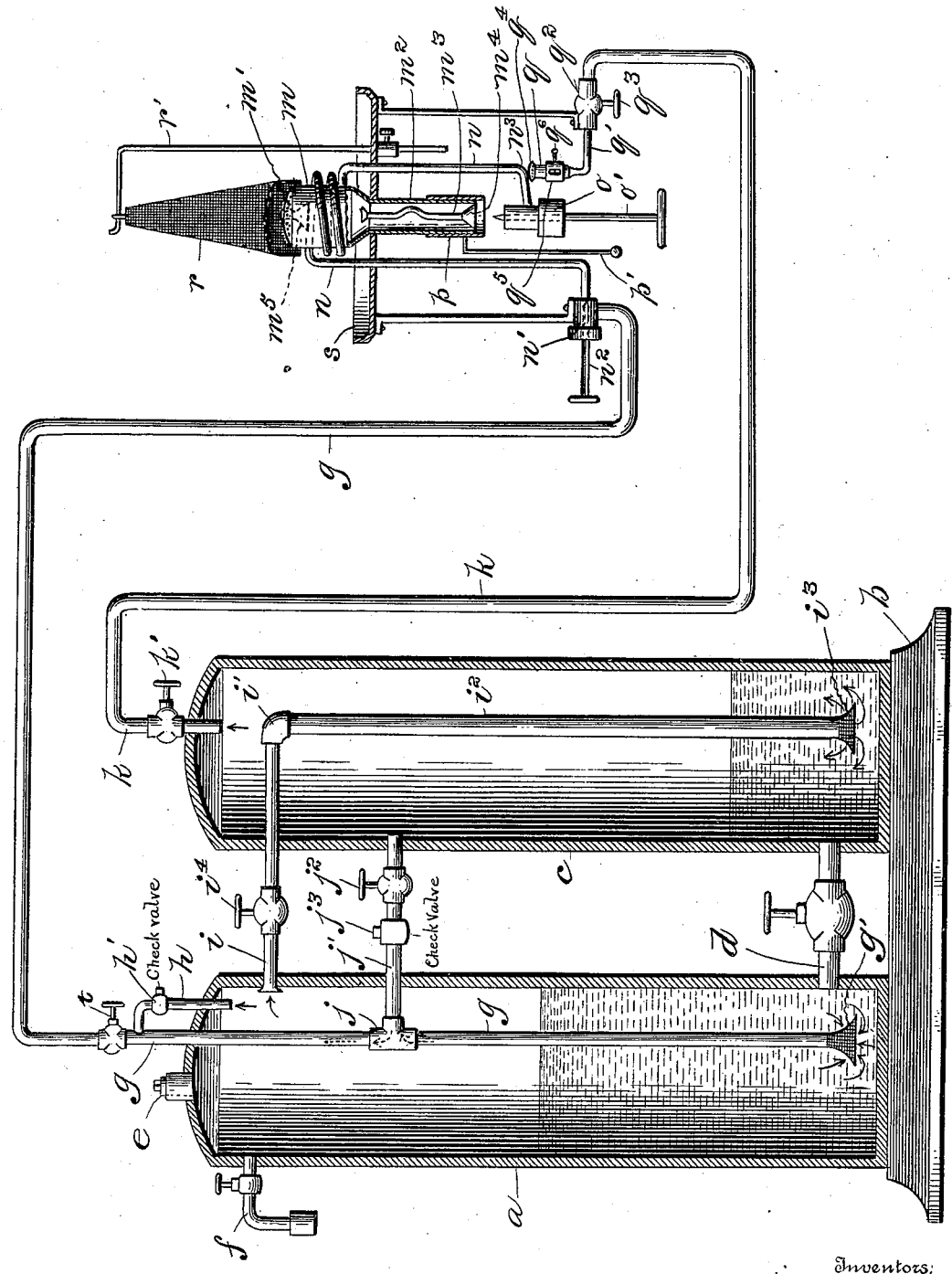
Witnesses
Marcus L. Byng.
Chas. E. Riordon
Inventors:
Lewis W. Johnson 2nd
Hilbert J. Falk,
by Crossley & Davis
their Attorneys.

UNITED STATES PATENT OFFICE.

LEWIS W. JOHNSON AND HILBERT J. FALK, OF NEW ORLEANS, LOUISIANA, ASSIGNORS TO THE JOHNSON-FALK LIGHT COMPANY, LIMITED, OF SAME PLACE.

SYSTEM OF OIL DISTRIBUTION.

SPECIFICATION forming part of Letters Patent No. 651,606, dated June 12, 1900.

Application filed February 7, 1900. Serial No. 4,330. (No model.)

*To all whom it may concern:*

Be it known that we, LEWIS W. JOHNSON and HILBERT J. FALK, of New Orleans, in the parish of Orleans and State of Louisiana, have invented certain new and useful Improvements in Apparatus for Producing and Burning Hydrocarbon Vapor, of which the following is a description sufficiently full, clear, and exact to enable those skilled in the art to which it appertains or with which it is most nearly connected to make and use the same.

The present invention relates to the production and burning of hydrocarbon vapors, and the chief aim is to increase the ratio of efficiency in heating or lighting to the consumption of fuel over what has heretofore been attained. We propose to accomplish this by a novel arrangment of means for treating a supply of liquid hydrocarbon, such as gasolene, preferably mixed with other volatile fluids, such as wood-alcohol and spirits of camphor, so as to evolve a vapor best adapted for combustion, and we also provide an improved form of burner for such vapor.

The drawing which accompanies and forms part of this specification represents, partly in section and partly in side elevation, a form of apparatus embodying the invention.

The reference-letter $a$ designates the main oil-reservoir in the form of an upright tank resting upon a suitable base $b$, which also supports a similar tank $c$, the latter receiving its supply of fluid from the first-mentioned tank through a valved pipe $d$, connecting the two tanks near the bottoms of the same. The tank $a$ is charged with its supply of liquid hydrocarbon through an opening at the top, in which there is a screw-plug $e$, and the said tank receives a charge of compressed air through a suitable valved pipe connection $f$, entering the upper portion of the tank and equipped with appropriate coupling means whereby it may be connected with a source of compressed air.

A pipe $g$ extends down through the top of the tank $a$ to near the bottom of the same, where it is fitted with a wire-gauze cap $g'$, constituting a strainer, through which the oil is forced under pressure of the air in the upper part of the tank. A pipe $h$ extends out of the top of the tank $a$ and joins the pipe $g$ a short distance beyond the point where the latter emerges from the tank, this pipe $h$ having a check-valve $h'$ incorporated in it and being designed to convey compressed air from within the reservoir to the oil conduit or pipe $g$ for admixture with the oil passing through the latter. It will be seen that such air will be entrained by the oil as the latter passes under pressure through the pipe $g$.

A pipe $i$ extends out of the upper portion of the tank $a$ across to the tank $c$ and into the same and is connected by an elbow $i'$ with a pipe $i^2$, which depends to within a short distance of the bottom of the tank $c$, where it is equipped with a flaring nozzle $i^3$ of wire-gauze. The level of the oil within the tank $c$ is kept some distance above the said flaring nozzle, and compressed air issuing through the latter forces its way through the oil and is carbureted and collects in the upper portion of the tank. The supply of compressed air for carbureting purposes is regulated by means of a valve $i^4$ in the pipe $i$. Some of the carbureted air is entrained by the oil passing up the pipe $g$, the latter being connected by a T-coupling $j$ and a pipe $j'$ with the interior of the tank $c$, said pipe $j'$ having a valve $j^2$ for controlling the passage of carbureted air to the pipe $g$ and also being provided with a check-valve $j^3$ to prevent oil flowing through the pipe into the tank $c$. A pipe $k$ leads out of the top of the latter, it being provided with a valve $k'$, and this pipe conducts carbureted air to a burner, hereinafter described, for completing vaporization of the oil which issues from the tank $a$ through the pipe $g$.

We prefer to use a mixture of gasolene, spirits of camphor, and wood-alcohol in the tanks in the proportion of ten per cent. of spirits of camphor and ten per cent. of wood-alcohol to eighty per cent. of gasolene-oil, this mixture having proved to give the best results in candle-power of lights burning vapor as produced by the operation of our invention.

We have here shown a burner for illuminating purposes; but of course it is to be understood that our invention may be employed in apparatus for heating as well as illuminating. The above-mentioned burner comprises a drum-like head $m$ with a perforated cap $m'$ and a tubular appendage $m^2$, within which there is a sinuous passage-way $m^3$, having a flaring mouth $m^4$ at its lower end for receiving the vapor, the force with which the latter enters being broken by passing through the sinuous passage-way, whereby injury to the mantle is guarded against. A bell $m^5$ spreads the vapor as it approaches the burner-cap $m'$. A pipe $n$ encircles the burner-head $m$ in one or more coils and on one side thereof extends to a valve-casing $n'$, with which the pipe $g$ communicates, the said casing having a needle-valve $n^2$ for controlling the flow of oil. On the other side of the burner-head the pipe $n$ extends down below the tubular appendage of the head and thence laterally to a valve-casing $o$, located directly below the flaring mouth $m^4$ of the vapor passage-way $m^3$ and containing a needle-valve $o'$ for controlling the passage of vapor to the burner. Such vapor passing across from the valve-casing $o$ to the tubular appendage of the burner entrains air, and the supply of air for this purpose is regulated by means of a sliding sleeve $p$, fitting the said tubular appendage and having a pendent adjusting-rod $p'$. A burner $q$ is located just below the bend $n^3$ of the pipe $n$, said burner being mounted on the end of a pipe $q'$, which enters a valve-casing $q^2$, having connected with it the carbureted-air conduit $k$ and being equipped with a suitable valve $q^3$. The burner $q$ is of cylindrical form, with a perforated cap $q^4$, and is preferably formed in one side with an opening for the admission of air, which opening is controlled by a damper in the form of a sleeve $q^5$, rotatable about the burner by means of a handle $q^6$. An incandescent mantle $r$ is suspended from a suitable support $r'$, so as to surmount the burner-head $m$, and just below the latter there is a globe-support $s$.

It will be seen that with the construction of apparatus described compressed air within the tank $a$, acting upon the body of liquid hydrocarbon therein, forces the same up the pipe $g$, and when the valve $j^2$ is open carbureted air will be entrained in the pipe $g$, and air under pressure will also enter the same through the pipe $h$, so that the valve $t$ controls the passage through the pipe $g$ of a mixture of oil, carbureted air, and air under pressure. Such mixture passing under control of the valve $n^2$ into the pipe $n$ will be vaporized at first by the heating of the pipe $n$ through the operation of the carbureted-air burner $q$, and the vapor thus produced passes across under control of the valve $o'$ into the sinuous passage-way $m^3$ and thence to the main burner. When the latter is in operation, vaporization of the liquid flowing through the pipe $n$ will take place by reason of the heating of said pipe in the portions thereof surrounding the burner. We may, however, and generally do keep the burner $q$ in operation to insure complete vaporization of the oil before it passes to the main burner, said burner $q$ being kept supplied with carbureted air from the tank $c$.

It will now be seen that an apparatus such as here shown and described is well calculated to accomplish the objects primarily stated. However, it is to be understood that the invention here disclosed is capable of being embodied in other forms than that in which we have preferred to show it in the present case.

Having thus explained the nature of the invention and described a way of constructing and using the same, though without attempting to set forth all of the forms in which it may be made or all of the modes of its use, it is declared that what is claimed is—

1. In apparatus of the character described, the combination of an oil-reservoir having a compressed-air connection and an outlet-pipe for the oil; a second reservoir, a compressed-air conduit leading from the first or main reservoir into the oil-space of the second reservoir; a pipe connection between the carbureted-air space of the latter and the oil-outlet pipe of the main reservoir; and a burner to which said outlet-pipe leads to convey thereto mingled oil and carbureted air.

2. In apparatus of the character described, the combination of an oil-reservoir having a compressed-air connection and an outlet-pipe for the oil; a second reservoir; a compressed-air conduit leading from the first or main reservoir into the oil-space of the second reservoir; a pipe connection between the carbureted-air space of the latter and the oil-outlet pipe of the main reservoir; a main burner to which the oil-conduit from the main reservoir leads; a burner for heating said conduit; and a conduit leading from the carbureting-reservoir to said second burner.

3. Apparatus of the character described, the same comprising an oil-reservoir having a connection for compressed air and an outlet-pipe for the oil and also a compressed-air conduit leading out of said reservoir and connecting with the said oil-pipe; a second reservoir; a compressed-air conduit leading from the first or main reservoir into the oil-space of the second reservoir; a pipe connection between the carbureted-air space of the latter and the oil-outlet pipe of the main reservoir; and a burner to which said outlet-pipe leads to convey thereto mingled oil and carbureted air.

4. Apparatus of the character described, the same comprising an oil-reservoir having a connection for compressed air and an outlet-pipe for the oil and also a compressed-air conduit leading out of said reservoir and connecting with the said oil-pipe; a second reservoir; a compressed-air conduit leading from the first or main reservoir into the oil-space of the second reservoir; a pipe connection between the carbureted-air space of the latter and the oil-outlet pipe of the main reservoir; a main burner to which the oil-conduit from the main reservoir leads; a burner for heating said conduit; and a conduit leading from the carbureting-reservoir to said second burner.

In testimony whereof we have signed our names to this specification, in the presence of two subscribing witnesses, this 1st day of February, A. D. 1900.

LEWIS W. JOHNSON.
   HILBERT J. FALK.

Witnesses:
 ARTHUR B. LEOPOLD,
 ETHAN A. BURRISS.